United States Patent
Bonin et al.

(10) Patent No.: US 10,832,009 B2
(45) Date of Patent: *Nov. 10, 2020

(54) EXTRACTION AND SUMMARIZATION OF DECISION ELEMENTS FROM COMMUNICATIONS

(71) Applicant: INTERNATIONAL BUSINESS MACHINES CORPORATION, Armonk, NY (US)

(72) Inventors: Francesca Bonin, Dublin (IE); Lea Deleris, Paris (FR); Debasis Ganguly, Dublin (IE); Killian Levacher, Dublin (IE); Martin Stephenson, Ballynacargy (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,972

(22) Filed: Jan. 2, 2018

(65) Prior Publication Data

US 2019/0205395 A1  Jul. 4, 2019

(51) Int. Cl.
| | | |
|---|---|---|
| *G06F 40/40* | (2020.01) | |
| *G06N 5/04* | (2006.01) | |
| *G06F 16/34* | (2019.01) | |
| *G06F 40/30* | (2020.01) | |
| *H04L 12/58* | (2006.01) | |
| *G10L 15/18* | (2013.01) | |

(52) U.S. Cl.
CPC ............ *G06F 40/40* (2020.01); *G06F 16/345* (2019.01); *G06F 40/30* (2020.01); *G06N 5/045* (2013.01); *G10L 15/1815* (2013.01); *H04L 51/04* (2013.01)

(58) Field of Classification Search
CPC .. G06Q 10/06316; G06Q 10/04; G06Q 10/06; G06Q 10/0635; G06Q 10/0637; G06Q 10/101; G06N 5/025; H04L 12/1822; H04L 65/403
See application file for complete search history.

(56) References Cited

U.S. PATENT DOCUMENTS

| | | | |
|---|---|---|---|
| 6,018,346 A | 1/2000 | Moran et al. | |
| 7,328,193 B2 | 2/2008 | Murata | |
| 7,809,792 B2 | 10/2010 | Hirata et al. | |
| 8,515,043 B2 | 8/2013 | Pott et al. | |
| 8,914,452 B2 | 12/2014 | Boston et al. | |
| 9,674,244 B2 | 6/2017 | Katzman et al. | |
| 9,691,412 B2 | 6/2017 | Totzke et al. | |
| 2007/0018953 A1 | 1/2007 | Kipersztok | |
| 2008/0040137 A1 | 2/2008 | Lee et al. | |

(Continued)

*Primary Examiner* — Thomas H Maung
(74) *Attorney, Agent, or Firm* — Griffiths & Seaton PLLC

(57) ABSTRACT

Embodiments for extraction and summarization of decision discussions of a communication by a processor. The decision elements may be grouped together according to similar characteristics. The decision elements may be linked, and sentiments of the discussion participants towards each of the decision elements may be analyzed. A summary of the plurality of decision elements may be provided via an interactive graphical user interface (GUI) on one or more Internet of Things (IoT) devices. The summary of the decision elements may be linked to domain knowledge. The summary may be enhanced using a domain knowledge.

15 Claims, 16 Drawing Sheets

(56) References Cited

U.S. PATENT DOCUMENTS

| | | | |
|---|---|---|---|
| 2011/0145230 A1* | 6/2011 | Eskey | G06Q 30/02 707/728 |
| 2015/0229698 A1* | 8/2015 | Swan | G06Q 10/101 709/203 |
| 2017/0132313 A1 | 5/2017 | Kukla et al. | |
| 2019/0108494 A1* | 4/2019 | Nelson | G06N 20/00 |

* cited by examiner

- AMI CORPUS – DISCUSSION ABOUT THE DESIGN OF REMOTE CONTROL

- INPUT DATA:
  - MEETING TRANSCRIPTS

A: SO THIS IS GOING TO BE ABOUT THE COMPONENT DESIGN.
B: SO FIRST THING IS WE NEED POWER SOURCE FOR THE REMOTE CONTROL.
A: SO I WAS OF THE IDEA THAT WE CAN HAVE TWO KIND OF POWER SUPPLIES, ONE IS THE USUAL BATTERIES WHICH ARE THERE, THEY COULD BE CHARGEABLE BATTERIES IF THERE'S A BASIS STATION KIND OF THING AND ON TOP OF THAT WE CAN HAVE SOLAR CELLS, WHEN THE LIGHTING CONDITIONS ARE GOOD THEY CAN BE USED SO IT'LL BE PRETTY UH INNOVATIVE KIND.
B: MM-HMM.
C: THEN UH WE NEED PLASTIC WITH SOME ELASTICITY SO THAT IF YOUR IF THE REMOTE CONTROL FALLS IT'S NOT BROKEN DIRECTLY INTO PIECES, THERE SHOULD BE SOME FLEXIBILITY IN T I GUESS THAT FITS IN WITH THE SPONGY KIND OF DESIGN PHILOSOPHY.
A: YEAH.
B: YEAH.
C: SO THERE SHOULD WE SHOULD THINK OF SOMETHING LIKE THAT AND THEN IT SHOULD BE DOUBLE CURVE.
C: THE S SCIENCE FOR THE EASE OF HANDLING AND THERE ARE SOME OTHER ISSUES WHY WE NEED DOUBLE CURVE.

OUTPUT 1 : HIGHLIGHT TEXT

PLEASE ENTER YOUR TEXT HERE:

```
A: SO THIS IS GOING TO BE ABOUT THE
COMPONENT DESIGN.
B: SO FIRST THING IS WE NEED POWER
SOURCE FOR THE REMOTE CONTROL.
C: SO I WAS OF THE IDEA THAT WE CAN
HAVE TWO KIND OF POWER...
```
704

[SUBMIT QUERY] [CLEAR]   702

A: SO THIS IS GOING TO BE ABOUT THE COMPONENT DESIGN.
B: SO FIRST THING IS WE NEED <u>POWER SOURCE</u> FOR THE REMOTE CONTROL.
A: SO I WAS OF THE IDEA THAT WE CAN HAVE <u>TWO KIND OF POWER SUPPLIES</u>, ONE IS THE <u>USUAL BATTERIES</u> WHICH ARE THERE, THEY COULD BE <u>CHARGEABLE BATTERIES</u> IF THERE'S A BASIS STATION KIND OF THING AND ON TOP OF THAT WE CAN HAVE <u>SOLAR CELLS</u>, WHEN THE LIGHTING CONDITIONS ARE GOOD THEY CAN BE USED SO IT'LL BE PRETTY UH <u>*INNOVATIVE KIND*</u>.
B: MM-HMM.
C: THEN UH WE NEED <u>PLASTIC WITH SOME ELASTICITY</u> SO THAT <u>*IF THE REMOTE CONTROL FALLS IT'S NOT BROKEN DIRECTLY INTO PIECES*</u>, THERE SHOULD BE SOME FLEXIBILITY IN IT IGUESS THAT FITS IN WITH THE SPONGY KIND OF DESIGN PHILOSOPHY.
A: YEAH.
B: YEAH.
C: SO THERE SHOULD WE SHOULD THINK OF SOMETHING LIKE THAT AND THEN IT SHOULD BE <u>DOUBLE CURVE</u>.
C: THE S SCIENCE FOR THE <u>*EASE OF HANDLING*</u> AND THERE ARE SOME OTHER ISSUES WHY WE NEED <u>DOUBLE CURVE</u>.

<u>ALTERNATIVES</u>
    <u>*CRITERIA*</u>

FIG. 7B

OUTPUT 2 : SUMMARY TABLE

PLEASE ENTER YOUR TEXT HERE:

```
A: SO THIS IS GOING TO BE ABOUT THE
COMPONENT DESIGN.
B: SO FIRST THING IS WE NEED POWER
SOURCE FOR THE REMOTE CONTROL.
C: SO I WAS OF THE IDEA THAT WE CAN
HAVE TWO KIND OF POWER...
```
— 704

[SUBMIT QUERY] [CLEAR] — 706

| ALTERNATIVES | CRITERIA |
|---|---|
| A | TWO KIND OF POWER SUPPLIES USUAL BATTERIES CHARGEABLE BATTERIES SOLAR CELLS | INNOVATIVE KIND |
| B | PLASTIC WITH SOME ELASTICITY | IF THE REMOTE CONTROL FALLS IT'S NOT BROKEN DIRECTLY INTO PIECES |
| C | DOUBLE CURVE DOUBLE CURVE | EASE OF HANDLING |

— 750

VISUALIZING CONTEXT OF THE CHUNK WHEN CLICKING. THE CONTEXT ALLOW THE USER TO BETTER UNDERSTAND THE PROPOSED INFORMATION. THE USER CAN THEN CONFIRM OR REJECT THE SUGGESTION.

708A —

```
B: MM-HMM.
C: THEN UH WE NEED PLASTIC WITH
SOME ELASTICITY SO THAT IF YOUR IF
THE REMOTE CONTROL FALLS IT'S NOT
BROKEN DIRECTLY INTO PIECES, THERE
SHOULD BE SOME FLEXIBILITY IN T I
GUESS THAT FITS IN WITH THE SPONGY
KIND OF DESIGN PHILOSOPHY.
A: YEAH.
```

[CONFIRM / REJECT ?] — 709

FIG. 7C

OUTPUT 3 : CLUSTERING CONCEPTS – FOCUSING ONLY ON A AND C

PLEASE ENTER YOUR TEXT HERE:

A: SO THIS IS GOING TO BE ABOUT THE COMPONENT DESIGN.
B: SO FIRST THING IS WE NEED POWER SOURCE FOR THE REMOTE CONTROL. C: SO I WAS OF THE IDEA THAT WE CAN HAVE TWO KIND OF POWER...

[SUBMIT QUERY] [CLEAR]

| ALTERNATIVES | | |
|---|---|---|
| POWER SOURCE<br>A: "POWER SOURCE"<br>A: "TWO KIND OF POWER SUPPLIES" | PRIMARY CELL | A: "USUAL BATTERIES" |
| | RECHARGEABLE BATTERIES | B: "CHARGEABLE BATTERIES" |
| | SOLAR CELL | C: "SOLAR CELLS" |
| MATERIAL | PLASTIC | B: "PLASTIC WITH ELASTICITY" |
| SHAPE<br>C: "DOUBLE CURVE"<br>C: "DOUBLE CURVE" | | |

| CRITERIA | |
|---|---|
| INNOVATIVE | A: "INNOVATIVE KIND" |
| UNBREAKABLE | C: "IF THE REMOTE CONTROL FALLS IT'S NOT BROKEN DIRECTLY INTO PIECES" |
| SHAPE | C: "EASE OF HANDLING" |

FIG. 7E

OUTPUT 4 : MAPPING TABLE ALTERNATIVES VS CRITERIA — 795

PLEASE ENTER YOUR TEXT HERE:

704

A: SO THIS IS GOING TO BE ABOUT THE COMPONENT DESIGN.
B: SO FIRST THING IS WE NEED POWER SOURCE FOR THE REMOTE CONTROL. C: SO I WAS OF THE IDEA THAT WE CAN HAVE TWO KIND OF POWER...

[SUBMIT QUERY] [CLEAR]

712

CRITERIA

| | INNOVATIVE<br>A: "INNOVATIVE KIND" | UNBREAKABLE<br>C: "IF THE REMOTE CONTROL FALLS IT'S NOT BROKEN DIRECTLY INTO PIECES" | SHAPE<br>C: "EASE OF HANDLING" |
|---|---|---|---|
| | | | |
| | (+) | | |
| | | (+) | C: THE SCIENCE FOR THE EASE OF HANDLING AND THERE ARE SOME OTHER ISSUES WHY WE NEED DOUBLE CURVE.  ● — 708C |

710

ALTERNATIVES

| POWER SOURCE<br>A: "POWER SOURCE"<br>A: "TWO KIND OF POWER SUPPLIES" | PRIMARY CELL<br>A: "USUAL BATTERIES" |
| | RECHARGEABLE BATTERIES<br>B: "CHARGEABLE BATTERIES" |
| | SOLAR CELL<br>C: "SOLAR CELLS" |
| MATERIAL | PLASTIC<br>B: "PLASTIC WITH ELASTICITY" |
| SHAPE | C: "DOUBLE CURVE"<br>C: "DOUBLE CURVE" |

FIG. 7F

EXTRACTION AND SUMMARIZATION OF DECISION ELEMENTS FROM COMMUNICATIONS

BACKGROUND OF THE INVENTION

Field of the Invention

The present invention relates in general to computing systems, and more particularly to, various embodiments for extraction and summarization of decision elements from communication messages by a processor.

Description of the Related Art

In today's society, consumers, businesspersons, educators, and others communicate over a wide variety of mediums in real time, across great distances, and many times without boundaries or borders. The advent of computers and networking technologies has made possible the intercommunication of people from one side of the world to the other. These computing systems allow for the sharing of information between users in an increasingly user friendly and simple manner. The increasing complexity of society, coupled with the evolution of technology, continues to engender the sharing of a vast amount of information between people.

SUMMARY OF THE INVENTION

Various embodiments for extraction and summarization of decision discussions of a communication by a processor, are provided. In one embodiment, by way of example only, a method for extraction and summarization of decision discussions of a communication, again by a processor, is provided. Decision elements relating to one or more decisions and criteria may be identified from one or more communications. The decision elements may be grouped together according to similar concepts. A summary of the plurality of the decision elements may be provided via an interactive graphical user interface (GUI) on one or more Internet of Things (IoT) devices. The summary of the decision elements may be linked to a domain knowledge. The summary may be enhanced using the domain knowledge.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7A-7F are diagrams depicting extraction and summarization of decision elements of communication messages according to the present invention;

DETAILED DESCRIPTION OF THE DRAWINGS

Figure 1:
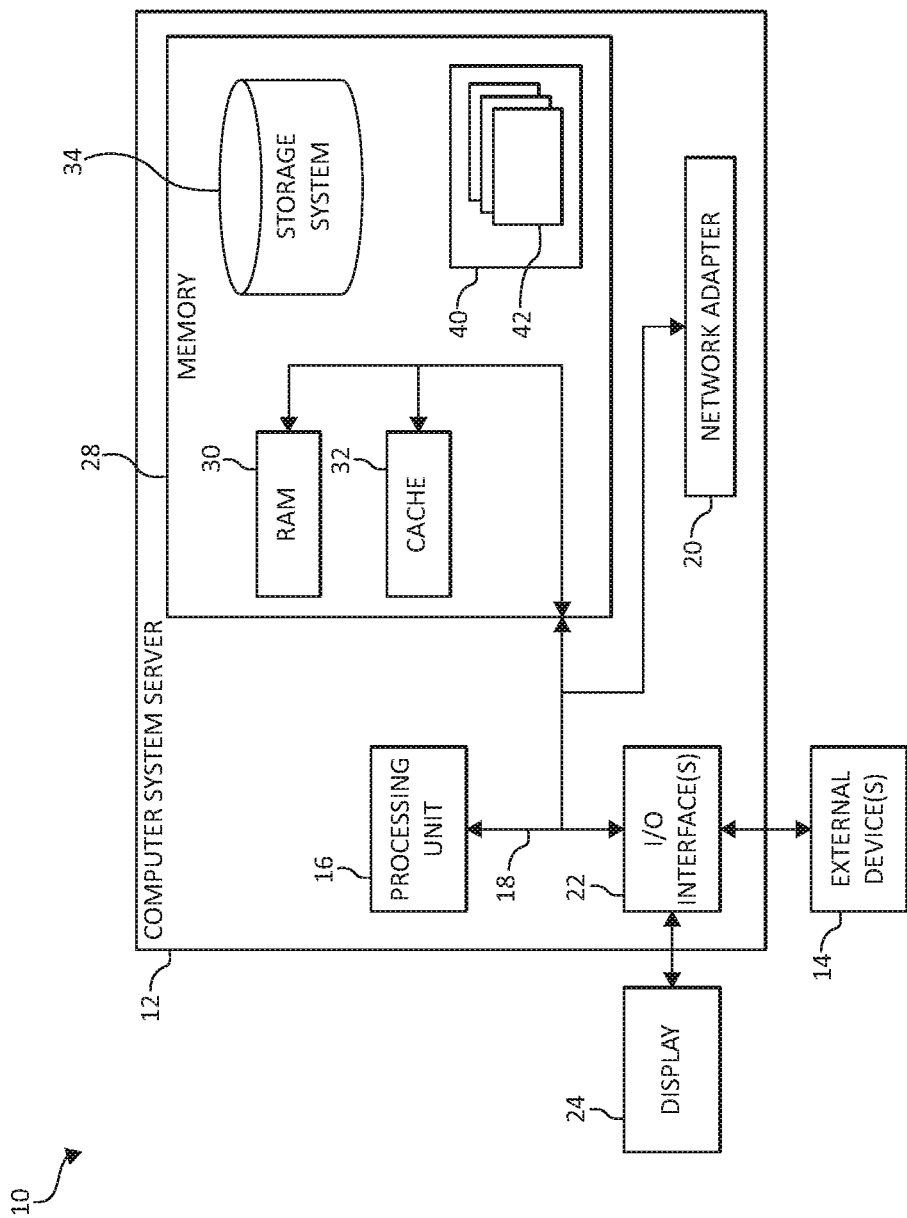
FIG. 1 is a block diagram depicting an exemplary cloud computing node according to an embodiment of the present invention.

The advent of real-time communication made possible by various computing devices enables people to share communication, such as emails, messages, speeches, social media posts, and other content. More specifically, as consumers, businesspersons, educators, and others have become more accessible and globalized, using various computing systems such as, for example, audio and/or video conferencing systems for meetings, conferences, or presentations. Often times, these meetings, conferences, or presentations include topics and subtopics involving participants (e.g., "decision makers") to engage in discussions to reach or make decisions.

These decision discussions often times are unstructured, inefficient and may partially or fully digress from the original topic or subtopic, particularly where decisions need to be made in a collaborative environment. Attempting to gather and provide structured talking points for decisions is currently time consuming and inefficient. Moreover, gathering and summarizing these decision discussions in a structured format from the collaborative environment is labor intensive and error prone. Consequently, having access to such structured representation and summarization of decision discussions would be useful in collaborative decisions: for example, when a final decision maker is required to consult with a group to obtain participant perspectives or when a consensus needs to be achieved amongst multiple participants.

Accordingly, various embodiments are provided herein for the extraction and summarization of key decision elements from discussions from various communications (e.g., audio data, video data, etc.). In one aspect, one or more communications (e.g., conversations) and the contexts of the communications may be tracked from multiple resources or data sources (e.g., video data, audio data, social media posts, video/audio threads, channels, protocols, email, short mail service ("SMS") messages, voice data/messages, and the like) on different applications and/or devices.

In one aspect, data such as, for example, communications, from one or more computing devices, having text data (e.g., transcripts of discussions, blogs, social media posts,) or audio and/or video recordings (with possible timestamps) may be received and gathered. The communications (e.g., text data, audio data, visual data) may be processed so as to 1) automatically transcribe speech data (for audio data) and/or process video data, 2) identify speakers/participants for each specific audio utterance of the data, 3) identify segments within the data pertaining to decision discussions along with the decision topic, 4) automatically extract decision elements, for example, criteria, alternatives, tradeoffs, constraints, etc., 5) group, cluster, and/or organize extracted information (including mapping decision alternatives and criteria of each decision), 6) enrich concepts of the decisions/communications by linking the decisions/communications to a domain knowledge (e.g., dbpedia), and/or 7) identify expressed sentiment by one or more participants towards raised decision elements in the communication (e.g., during a meeting). In other words, the present invention may digest and process the audio data, video data, and/or text data for extracting one or more decision elements that may be grouped, coordinated, and organized for later processing.

The mechanisms of the illustrated embodiments may provide a structured summary of one or more decision elements of the communications so as to enable a user, participant, or other third party to interact with the structured summary. The structured summary may be displayed on an interactive graphical user interface ("GUI") as a visual representation of the summary. The visual representation of the summary may a) enable users to filter on keywords, authors/contributors, dates, and/or other selected aspects, b) scrutinize each piece of extracted information in context so as to determine (either automatically performed and/or via a user) as to whether the extracted information was correctly identified or not or simply to help the user understand the meaning, etc., and/or c) identify expressed sentiment by one or more participants towards the decision elements, for instance, alternatives and/or criteria. Other examples of various aspects of the illustrated embodiments, and corresponding benefits, will be described further herein.

In one aspect, the present invention provides for extraction and summarization of decision discussions of a communication by identifying and extracting decision elements relating to one or more decisions from one or more communications so as to provide a summary of the decision elements.

In an additional aspect, one or more decision elements relating to one or more decisions and criteria may be identified from one or more communications. The decision elements may be grouped together according to similar characteristics. The decision elements may be linked, and sentiments of the discussion participants towards each of the decision elements may be analyzed. A summary of the plurality of the decision elements may be provided via an interactive graphical user interface (GUI) on one or more Internet of Things (IoT) devices. The summary of the decision elements may be linked to domain knowledge. The summary may be enhanced using domain knowledge.

In one aspect, the GUI may be provided so as to enable the user to interact with a summary table, containing the summary of the decision elements, to visualize extracted information under different formats enriched with links to external knowledge to support one or more decisions in the summary table. Each atomic piece of extracted information associated with each extracted element may be scrutinized, analyzed, edited, corrected, confirmed, and/or rejected. The extracted information may be filtered by date, time, and/or authors for selected use cases (or to provide users to focus on a subset of the speakers). A consensus and/or dissension may be identified from the extracted information relating to alternatives and/or criteria. One or more suggestions or recommendations relating to one or more decisions, consensus, and/or dissension may be provided. In one aspect, the suggestions and/or recommendations may be ranked according to identified criteria.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
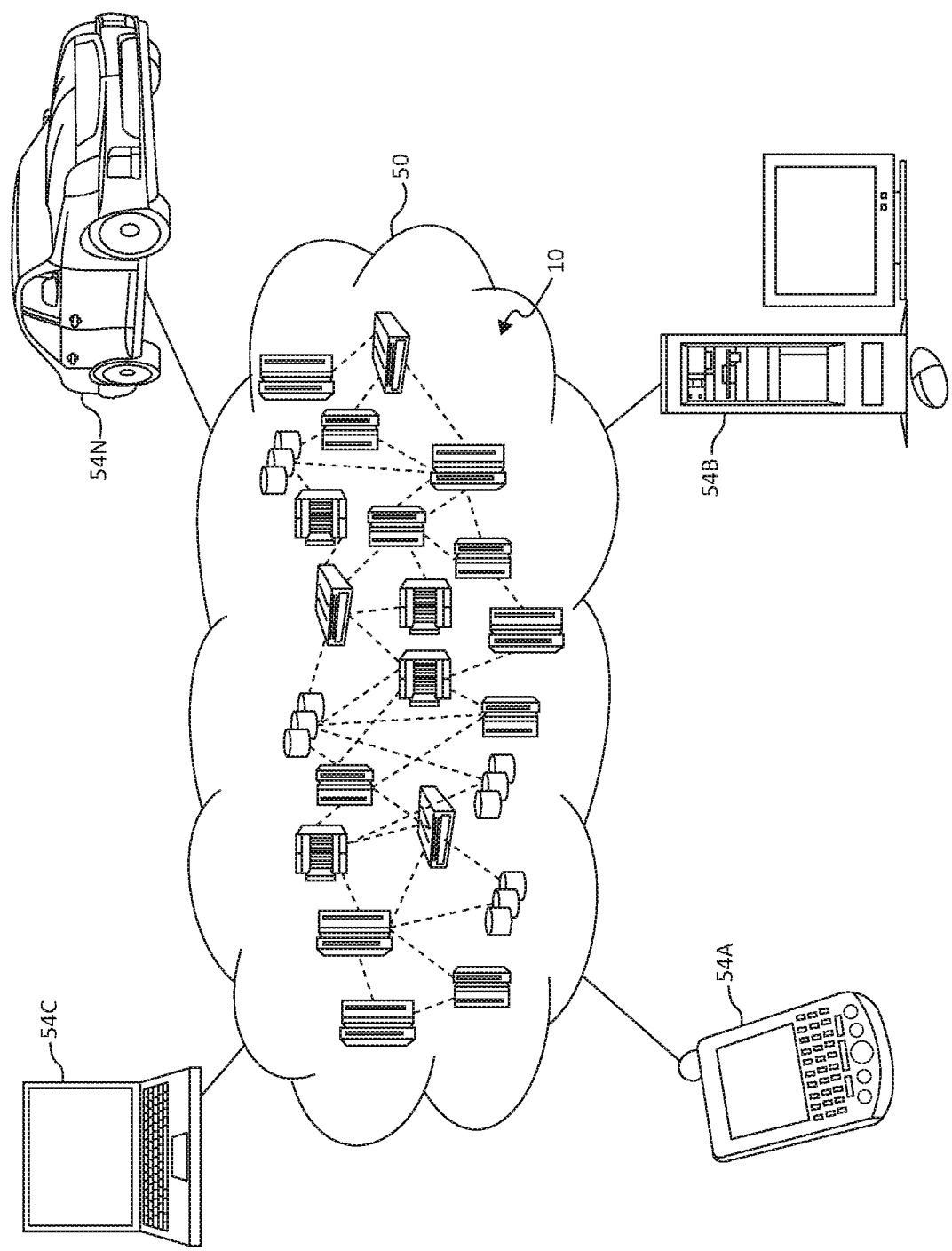
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
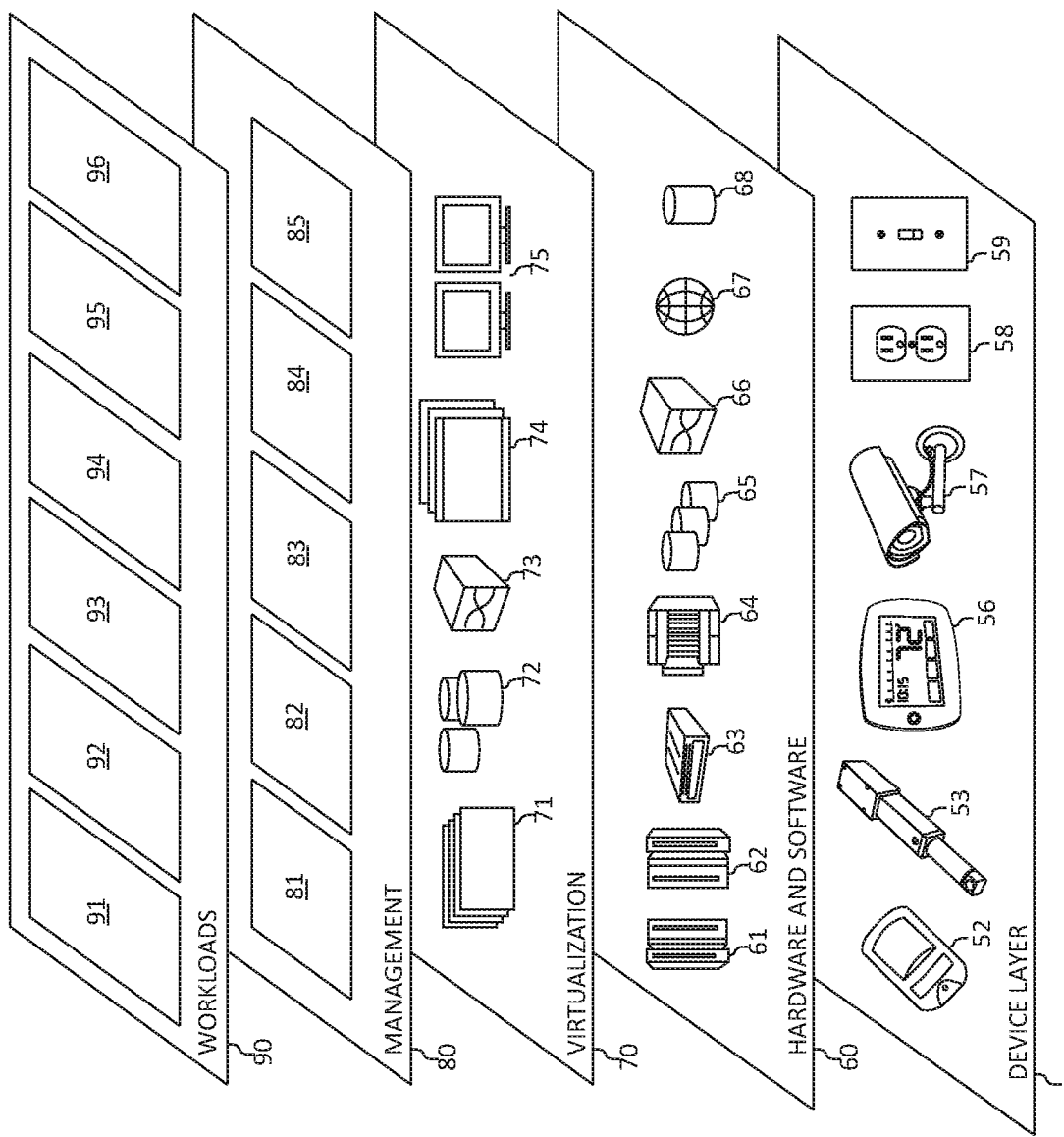
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various extraction and summarization of decision workloads and functions 96. In addition, extraction and summarization of decision workloads and functions 96 may include such operations as data analytics, data analysis, and as will be further described, notification functionality. One of ordinary skill in the art will appreciate that the extraction and summarization of decision workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for extraction and summarization of decision discussions of a communication. Decision elements relating to one or more decisions and criteria may be identified from one or more communications. The decision elements may be grouped together according to similar concepts. A summary of the plurality of the decision elements may be provided via an interactive GUI on one or more IoT devices. The summary of the decision elements may be linked to a domain knowledge. The summary may be enhanced using the domain knowledge.

Figure 4:
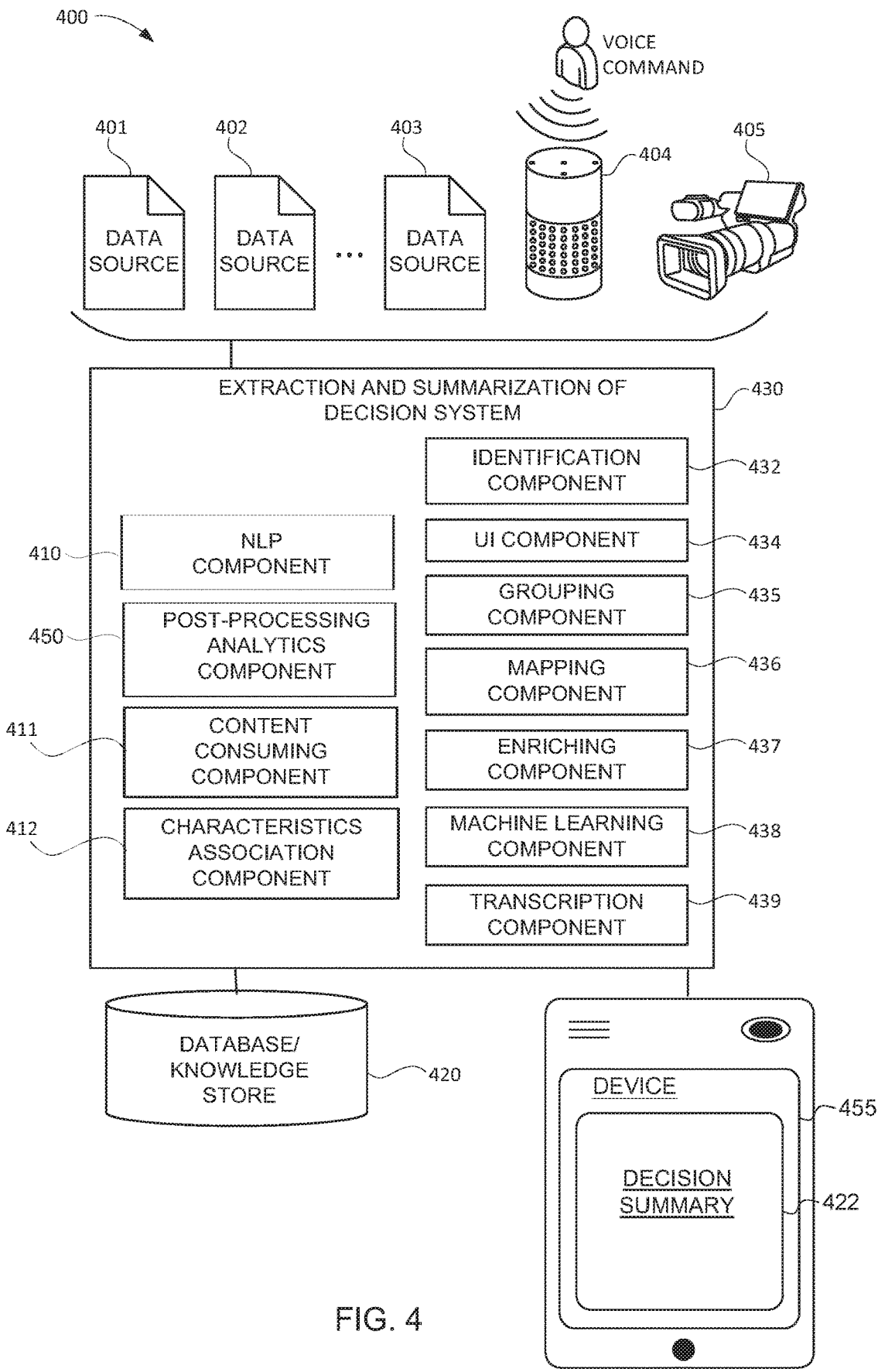
FIG. 4 is a diagram depicting various user hardware and computing components functioning in accordance with aspects of the present invention.

Turning now to FIG. 4, a block diagram of exemplary functionality 400 relating to extraction and summarization of decision discussions is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for extraction and summarization of decision methods and features in accordance with the present invention, such as those described in FIGS. 1-3. Many of the functional blocks 400 may execute as background processes on various components, either in distributed computing components, or on the user device, or elsewhere.

Multiple data sources 401-405 may be provided by one or more content contributors. The data sources 401-405 may be provided as a corpus or group of data sources defined and/or identified. The data sources 401-405 may include, but are not limited to, data sources relating to one or more documents, materials related to emails, books, scientific papers, online journals, journals, articles, drafts, audio data, video data, and/or other various documents or data sources capable of being published, displayed, interpreted, transcribed, or reduced to text data. The data sources 401-405 may be all of the same type, for example, pages or articles in a wiki or pages of a blog. Alternatively, the data sources 401-405 may be of different types, such as word documents, wikis, web pages, power points, printable document format, or any document capable of being analyzed by a natural language processing system.

In addition to text based documents, other data sources such as audio, video or image sources may also be used wherein the audio, video or image sources may be pre-analyzed to extract or transcribe their content for natural language processing, such as converting from audio to text and/or image analysis. For example, a voice command issued by a content contributor may be detected by a voice-activated detection device 404 and record each voice command or communication. The recorded voice command/communication may then be transcribed into text data for natural language processing. As an additional example, a video capturing device 405 (e.g., a camera) may record a video such as, for example, a webinar or meeting where cameras are installed in a room for broadcasting the meeting to remote locations where various intellectual property content contributors may collaborate remotely. The video data captured by the video capturing device 405 may be analyzed and transcribed into images or text data for natural language processing. The group of data sources 401-405 are consumed for an extraction and summarization of decision system such as, for example, extraction and summarization of decision system 430 using natural language processing (NLP) and artificial intelligence (AI) to provide processed content.

The data sources 401-405 may be analyzed by an NLP component 410 (and a transcription component 439 if necessary) to data mine or transcribe relevant information from the content of the data sources 401-405 (e.g., documents, emails, reports, notes, audio records, video recordings, live-streaming communications, etc.) in order to display the information in a more usable manner and/or provide the information in a more searchable manner. The NLP component 410 may be provided as a cloud service or as a local service.

The extraction and summarization of decision system 430 may include the NLP component 410, a content consuming component 411, a characteristic association component 412, and a post-processing analytics component 450. The NLP component 410 may be associated with the content consuming component 411. The content consuming component 411 may be used for inputting the data sources 401-405 and running NLP and AI tools against them, learning the content, such as by using the machine learning component 438. It should be noted that other components of FIG. 4 may also employ one or more NLP systems and the NLP component 410 is merely illustrated by way of example only of use of an NLP system. As the NLP component 410 (including the machine learning component 438) learns different sets of data, the characteristics association component 412 (or "cognitive characteristics association component") may use the artificial intelligence to make cognitive associations or links between data sources 401-405 by determining common concepts, methods, features, similar characteristics, and/or an underlying common topic.

Cognition is the mental process of knowing, including aspects such as awareness, perception, reasoning and judgment. An AI system uses artificial reasoning to interpret the data sources 401-405 and extract their topics, ideas, or concepts. The learned decisions, decision elements, alternatives to the decision, alternative options/choices, decision criteria, concepts, suggestions, topics and subtopics of a domain of interest, may not be specifically named or mentioned in the data sources 401-405 and is derived or inferred by the AI interpretation.

The learned content of the data sources consumed by the NLP system may be merged into a database 420 (and/or knowledge store) or other data storage method of the consumed content with learned concepts, methods, and/or features of the data sources 401-405 providing association between the content referenced to the original data sources 401-405.

The database 420 may also work in conjunction with the transcription component 439 to maintain a timestamped record of all interactions and contributions of each content contributor, decision, alternative, criteria, subject, topic, or idea. The database 420 may record and maintain the evolution of decisions, alternatives, criteria, subjects, topics, ideas, or content discussed in the data sources 401-405.

The database 420 may track, identify, and associate all communication threads, messages, transcripts, and the like of all data generated during all stages of the development or "life cycle" of the decisions, decision elements, alternatives, choices, criteria, subjects, topics, or ideas. The merging of the data into one database 420 (which may include a domain knowledge) allows the extraction and summarization of decision system 430 to act like a search engine, but instead of keyword searches, it will use an AI method of making cognitive associations between the data sources using the deduced concepts.

The extraction and summarization of decision system 430 may include a user interface ("UI") component 434 (e.g., an interactive graphical user interface "GUI") providing user interaction with the indexed content for mining and navigation and/or receiving one or more inputs/queries from a user. More specifically, the user interface component 434 may be in communication with a wireless communication device 455 (see also the PDA or cellular telephone 54A, the desktop computer 54B, the laptop computer 54C, and/or the automobile computer system 54N of FIG. 2.) for also providing user input for inputting data such as, for example, data sources 401-405 and also providing user interaction with a summary of the decision elements, alternatives, and/or criteria. The wireless communication device 455 may use the UI component 434 (e.g., GUI) for providing input of data and/or providing a query functionality such as, for example, interactive GUI functionality for enabling a user to enter a query in the GUI 422 relating to a domain of interest, topic, decision, alternative, criteria, summary of decisions, and/or an associated objective. For example, GUI 422 may display a decision summary (e.g., a summary of the decision elements, alternatives, and/or criteria).

The extraction and summarization of decision system 430 may also include an identification component 432. The identification component 432 may use data retrieved directly from one or more data sources or stored in the database 420 (or multiple immutable ledgers). The identification component 432 may identify segments and topics that pertain to the one or more decisions, identify each decision element pertaining to the one or more decisions and the criteria of each of the one or more decisions, and/or identify and extract the criteria and one or more alternative suggestions relating to the one or more decisions.

The extraction and summarization of decision system 430 may also include a grouping component 435 for grouping, clustering, and/or organizing the plurality of decision elements according to similar concepts. The grouping component 435 may group, cluster, and/or organize decision elements, decisions, alternative decisions/choices, and/or decision criteria together based on the context, similar sentiments, similar concepts, and/or timestamp of the communications (e.g., audio/video data and/or text data having a timestamp indicating the communication occurs during the same time such as, for example, video data, audio data, notes, and/or text data of a meeting occurring at a selected time). The grouping component 435 may track the evolution of ideas, topics/subtopics, decisions, decision elements, alternatives, criteria and/or content that may be discussed in the documents or records of the database 420 (e.g., from the start of a conference meeting until the end of the conference meeting).

In one aspect, once the NLP component 410 has carried out the linking of the data, the identification component 432 may mine the associated concepts, topics, or similar characteristics from the database 420 of the consumed content to assign a degree of ownership to each content contributor or participants in the discussion. This can be helpful to identify persons who provide useful decision elements such as, for example, alternatives or relevant criteria, it can also be used, for instance, for various types of data.

The extraction and summarization of decision system 430 may also include an enriching component 437 for linking decisions, decision elements, alternative decisions, alternative suggestions, alternative choices, criteria, and/or summary of the plurality of the decision elements to a domain knowledge, which may be included in the database 420 and/or associated with the database 420. The enriching component 437 may enhance the decisions, decision elements, alternative decisions, alternative suggestions, alternative choices, criteria, and/or summary using the domain knowledge.

The extraction and summarization of decision system 430 may include a mapping component 436. The mapping component may map one or more alternative decisions, alternative suggestions, and alternative choices to one or more criteria.

The extraction and summarization of decision system 430 may include a post-processing analytics component 450 that may be used to identify a consensus or dissension to the one or more decisions by one or more users involved in the communications. The post-processing analytics component 450 may also be used to provide one or more recommendations or suggestions (via the UI component) to follow relating to the one or more decisions. The post-processing analytics component 450 may also provide one or more alternative suggestions relating to the one or more decisions, consensus, and/or dissension.

A transcription component 439 may also be included in the extraction and summarization of decision system 430. For example, the transcription component 439 may be used to transcribe audio data or image/video data from data sources 404 or 405. For example, a voice command/communication captured by the voice-activated detection device 404 may be transcribed by the transcription component 439 into text data for natural language processing. As an additional example, the video data captured by the video capturing device 405 may be analyzed and transcribed by the transcription component 439 into text data for natural language processing.

The extraction and summarization of decision system 430 may also include a machine learning component 438. The machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

In one aspect, the domain knowledge may be an ontology of concepts representing a domain of knowledge. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Additionally, the domain knowledge may include one or more external resources such as, for example, links to one or more Internet domains, webpages, and the like. For example, text data may be hyperlinked to a webpage that may describe, explain, or provide additional information relating to the text data. Thus, a summary may be enhanced via links to external resources that further explain, instruct, illustrate, provide context, and/or additional information to support a decision, alternative suggestion, alternative choice, and/or criteria.

In one aspect, the extraction and summarization of decision system 430 may perform one or more various types of calculations or computations. The calculation or computation operations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.). It should be noted that each of the components of the extraction and summarization of decision system 430 may be individual components and/or separate components of the extraction and summarization of decision system 430.

Figure 5A:
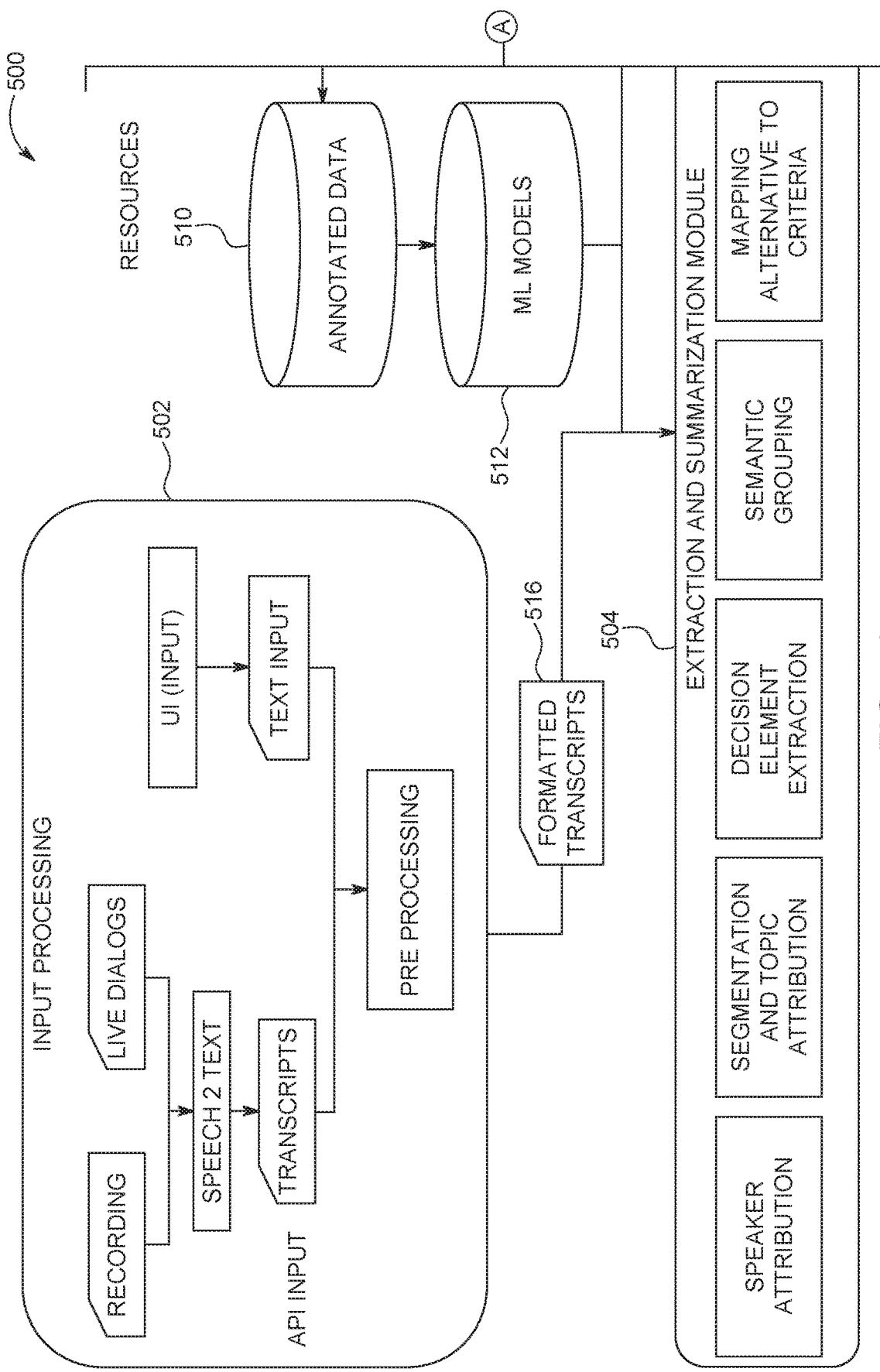
FIG. 5A-5B are additional diagrams depicting various user hardware and computing components functioning in accordance with aspects of the present invention.
Figure 5B:
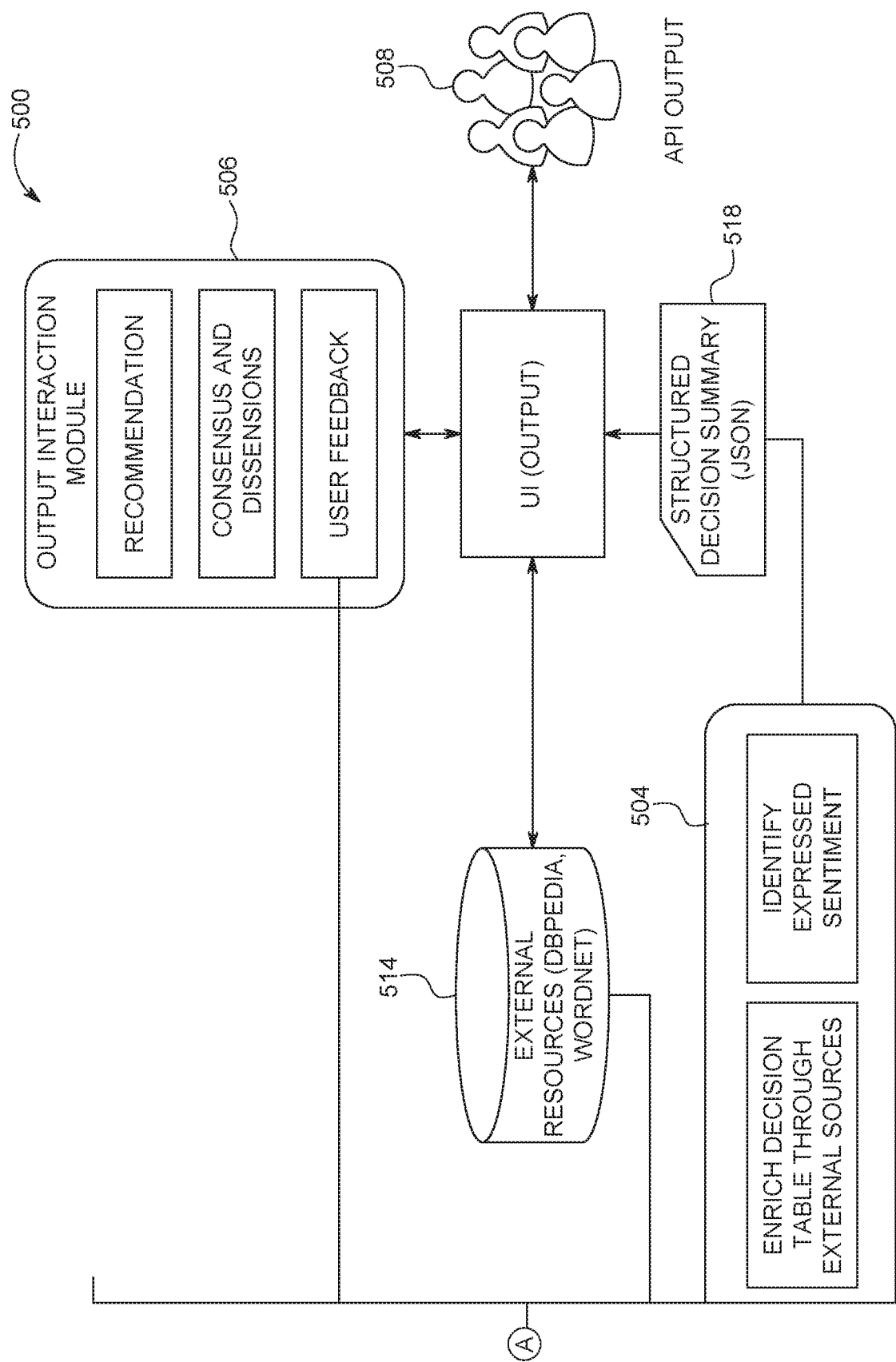

In view of the method 400 of FIG. 4, FIG. 5A-5B depict additional system architecture of an extraction and summarization of decision system. The extraction and summarization of decision system 500 may be implemented in hardware and/or software, such as by the computer/server 12 (FIG. 1), the workloads layer 90 (FIG. 3), and/or the various aspects, functionality, systems, and components described in FIG. 4.

Turning now to FIG. 5A-B, a block diagram of exemplary functionality 500 relating to an extraction and summarization of decisions system is depicted. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-3. With the foregoing in mind, the module blocks 500 may also be incorporated into various hardware and software components of a system for extraction and summarization of decisions in accordance with the present invention, such as those described in FIGS. 1-3. Many of the functional blocks 500 may execute as background processes on various components, either in distributed computing components, or on the user device, or elsewhere.

As a preliminary matter, the extraction and summarization of decisions system 500 may include an extraction and summarization module 504, one or more resources such as, for example, annotated data 510, machine learning ("ML") models 512, and/or external resources 514 (e.g., DBpedia, WordNet, a domain knowledge, the Internet, etc.), an output interaction module 506, one or more user interfaces ("UI") (e.g., an interactive GUI), and one or more users 508. It should be noted that each of the components of the extraction and summarization of decision system 500 may be included in one computer system/server 12 of FIG. 1 and/or included in multiple computer systems/servers such as, for example, in one or more cloud computing nodes 10 of the cloud computing environment 50 of FIG. 2.

In operation, the extraction and summarization of decision system 500 may perform an input processing operation 502. For example, one or more recordings and/or live communication dialogs may be processed by converting speech data and/or video data into a transcript (e.g., text document). For example, a Speech2Text operation may convert audio information to text data, and/or an optical character recognition ("OCR") operation may convert image input to text data. Alternatively, input data from a UI (e.g., "UI (input)") may be received as text input. The transcripts and input data may be processed (e.g., preprocessed for later, additional processing) to produce a formatted transcript 516.

Using the formatted transcripts 516, one or more of the resources such as for example, the annotated data 510, the ML (Machine Learning) models 512, the external resources 514, and/or received user feedback from the output interaction module 506, the extraction and summarization module 504 may include providing functionality for speaker attribution (e.g., identifying a speaker associated with communication data), providing functionality for segmentation and topic attribution (e.g., attributing and/or determining a data segment and topic/subtopic), extracting decision elements, semantic grouping, mapping alternatives to criteria functionality, enrichment of decisions through external sources, and/or identifying of expressed sentiment toward decision element functionality.

The extraction and summarization component 504 may provide a structured decision summary (e.g., JavaScript® Object Notification "JSON") to be used by the UI (output) to be visually displayed to one or more users 508 via an application programming interface ("API") output. Moreover, the UI (output) may receive user feedback from the users 508 via the output interaction module 506. In one aspect, the UI (output) may be communicated with the annotated data 510, to record feedback from users and enable to relearn ML models over time based on a broader input set (which lead to increases in performance and computing efficiency). Also, the output interaction module 506 may include one or more recommendations relating to the decision summary while also identifying, receiving from, and/or providing to the users 508 consensus and/or dissensions relating to the decisions and/or recommendations via the UI (output).

Figure 6:
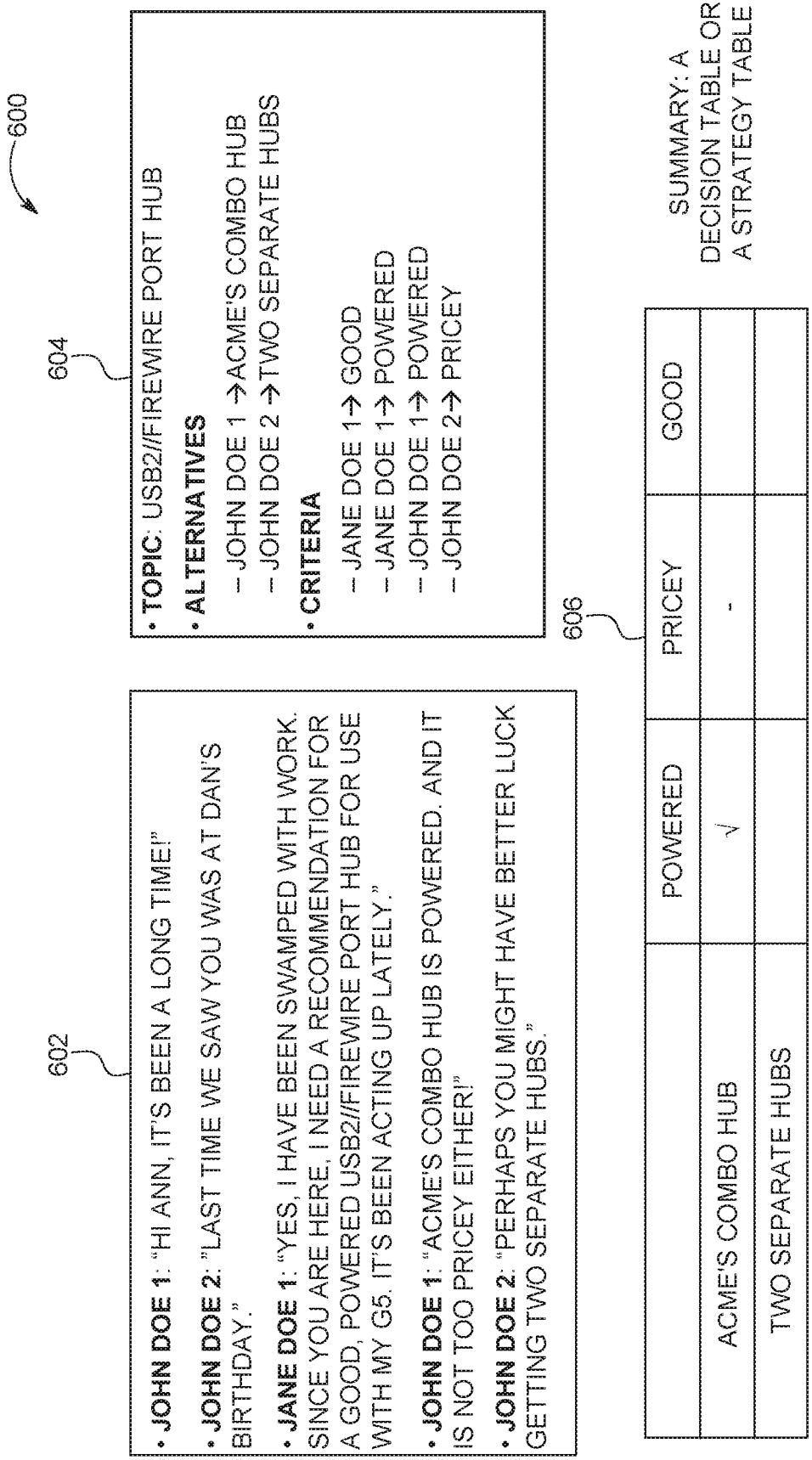
FIG. 6 is a diagram depicting communication messages having decisions for extraction and summarization according to the present invention.

With the foregoing in mind, FIG. 6 is a block flow diagram 600 of communication messages for extraction and summarization of decisions. The communication messages for extraction and summarization of decisions of block flow diagram 600 may be incorporated into various hardware and software components of a system for extraction and summarization of one or more decisions from a communication in accordance with the present invention such as, for example, within computer system/server 12 of FIG. 1. Also, diagram 600 may be implemented in hardware and/or software, such as by workloads layer 90 (FIG. 3), and/or the extraction and summarization of decision system 430 of FIG. 4 and/or FIG. 5A-5B.

Starting in block 602, a received and analyzed communication message 602 may be reduced to a text document (e.g., multiple communications/messages such as, for example, chat threads, channels, protocols, and formats, an image, audio, video, etc.) that are now processed into a selected format (e.g., a text format). The communication message 602 may indicate one or more speakers, such as for example, John Doe 1, John Doe 2, and/or Jane Doe 1. The text data may be analyzed and processed. A summary 604 may be produced to include a topic, alternatives, and/or criteria. In an additional aspect, the summary 604 may also be provided in a structured, summary table 606, often referred to as a decision table or strategy table, that identifies links between decision elements such as, for example, alternatives and criteria.

For example, the summary 604 may include the topic "USB2/Firewire port hub". One or more alternatives may be provided such as, for example, "acme's combo hub" and/or "two separate hubs" as provided by John Doe 1 and John Doe 2. The criteria may indicate, for example, "good," "powered," and/or "pricey," as provided by John Doe 1, John Doe 2, and/or Jane Doe 1. Again, summary 604 may be provided in the summary table 606 as displayed in an alternative format and/or view.

Turning now to diagrams of FIGS. 7A-7F, consider the various additional examples depicted in block/flow diagrams 700, 725, 750, 775, 785, and 795 that illustrate the progression of operations for extraction and summarization of decision elements from communication messages. Aspects of FIGS. 7A-7F may also be incorporated into various hardware and software components of a system for extraction and summarization of decisions, such as by the computer/server 12 (FIG. 1), the workloads layer 90 (FIG. 3), and/or the extraction and summarization of decision system 430 of FIG. 4 and/or FIG. 5A-5B.

Turning now to FIG. 7A, diagram 700 illustrates text data 702 (e.g., a meeting transcript) such as, for example, that discusses a design of a remote control. That is, the text data 702 may be used as input data into an extraction and summarization of decision system. In one aspect, the text data 702 may be received from a user input 704 whereby data may be automatically received and/or input into the user input 704, as illustrated in diagram 725 of FIG. 7B. The data input into the user input 704 may be analyzed, processed, and organized, as described herein, to produce the text data 702. The text data may include and/or identify alternatives and/or criteria of one or more discussions and/or decisions. As illustrated in FIG. 7B, the alternatives are illustrated with "under-lined text" and the criteria are illustrated with both "under-lined and italicized text" by way of example only.

The text data 702 may be analyzed to provide a summary such as, for example, a summary table 706 that contains one or more speaker(s) identified in the text data 702 (e.g., speakers A, B, and C), as in diagram 750 of FIG. 7C. In one aspect, the summary table 706 may be visually displayed in a GUI, such as GUI 422 of FIG. 4. Thus, the summary table 706 provides visualizing context of a portion or chunk of the alternatives or criteria to enable a user to gain a clearer or enhanced understanding of the proposed information (e.g., proposed alternatives and criteria). That is, the user may select and/or hover over a portion of the summary table 706 so as to generate a "pop-up box" or screen 708A that may provide the original communication between the speakers, such as, the dialog between speakers A, B, and C. The screen 708A may also include an interactive option 709 (e.g., as part of the interactive GUI 422 of FIG. 4) displayed for confirming and/or rejecting the displayed communication in the screen 708A.

Figure 7D:

Additionally, as illustrated in diagram 775 of FIG. 7D, decision elements from the summary table 706 of FIG. 7C can be grouped hierarchically according to similar characteristics, here illustrated through semantic similarity for decisions 710 and 712 for criteria. A user may hover over either the alternatives 710 and/or criteria 712 so as to generate a "pop-up box" or screen 708B that may provide additional information that enriches, enhances, and/or provides improvement to the alternatives 710 and/or criteria 712. That is, the alternatives 710 may be enriched and/or enhanced by one or more external resources such as, for example, a domain knowledge and/or the internet. For example, a user may select "primary cell" of the enhanced data 710 and a link may be provided to the appropriate external resource such as, for example, a webpage (e.g., https://en.wikipeida.org/wiki/primary cell) that provides additional information, explanations, discussions, and/or descriptions of the selected alternative (e.g., primary cell). A filtering component 714 may also be provided or displayed to a user such as, for example, via GUI 422 of FIG. 4, to enable the user to filter the summary table 706 by author (e.g., speakers such as speaker A, B, and C) of the alternatives and/or criteria.

More specifically, diagram 785 of FIG. 7E depicts the filtering component 714 filtering out speaker B and displays only the alternatives 710 (with the enriched/enhanced data) and/or criteria 712 as provided by speaker A and speaker B of the text data 702 of FIGS. 7A-B retrieved from user input 704.

As illustrated in FIG. 7F, the output 795 of summary table 706 depicts the alternatives 710 mapped to the criteria 712. For example, "double curve" for the shape provided by speaker C may be provided as an alternative that is mapped to the criteria provided by speaker C of "ease of handling." A user may also select a portion of the mapped summary table 706 of the alternatives 710 mapped to the criteria 712 so as to generate a "pop-up box" or screen 708C that may provide additional information such as, from speaker C, that provides the original context/communication relating to the alternative "shape" of "double curve" mapped to the criteria of "ease of handling."

Thus, using the various aspects and embodiments described in FIGS. 7A-7F, one or more operations may be built and employed based on the data (e.g., extracted information) to detect consensus information and/or dissenting information. The data may be used to provide one or more suggestions and/or recommendations. Said differently, the data may be used to identify consensus and dissensions about the alternatives and/or criteria, and/or obtain a recommendation by providing a ranking of the identified criteria.

Figure 8A:
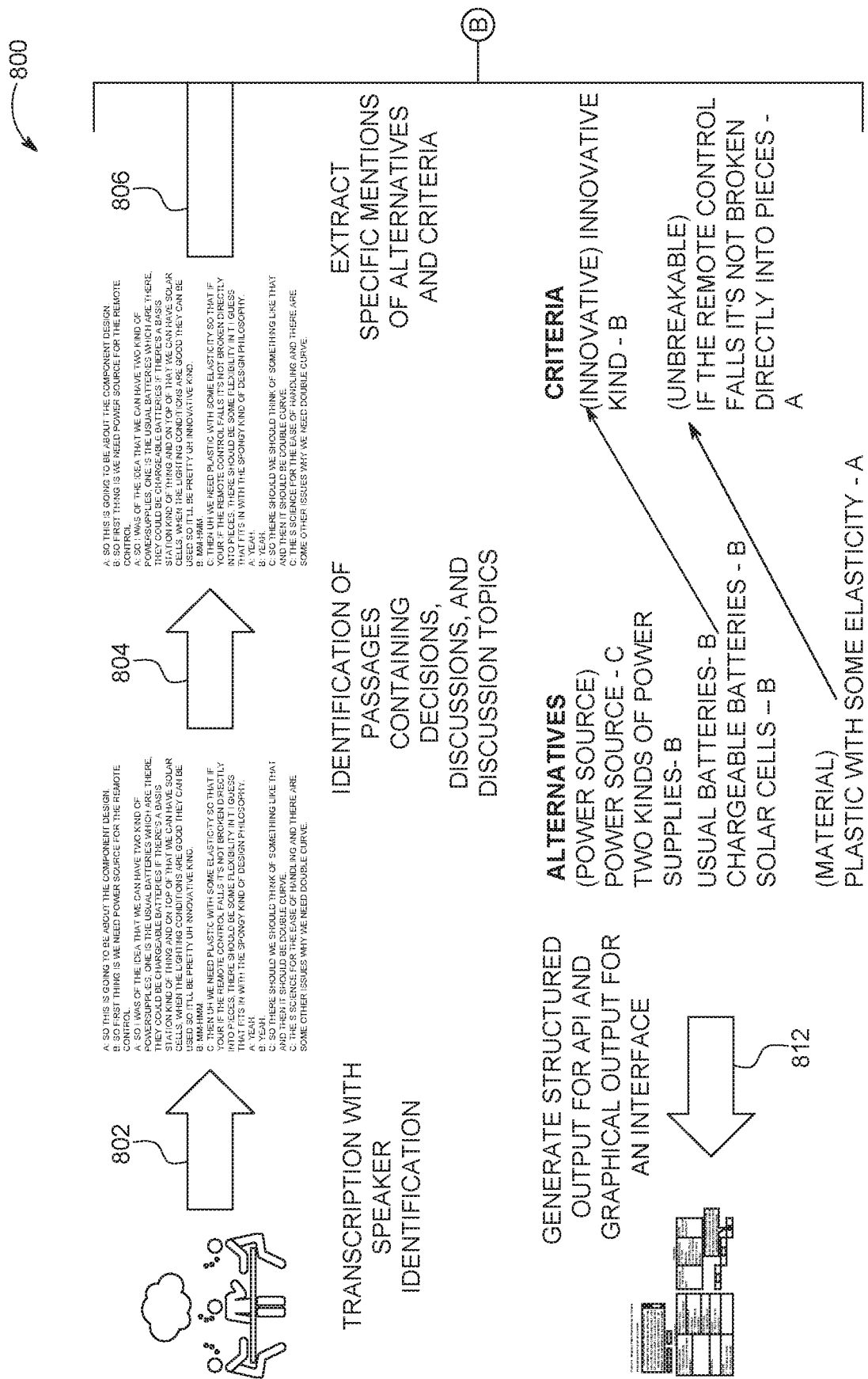
FIG. 8A-B is a flowchart diagram depicting an exemplary method for extraction and summarization of decision elements from communication messages, in which various aspects of the present invention may be realized.
Figure 8B:
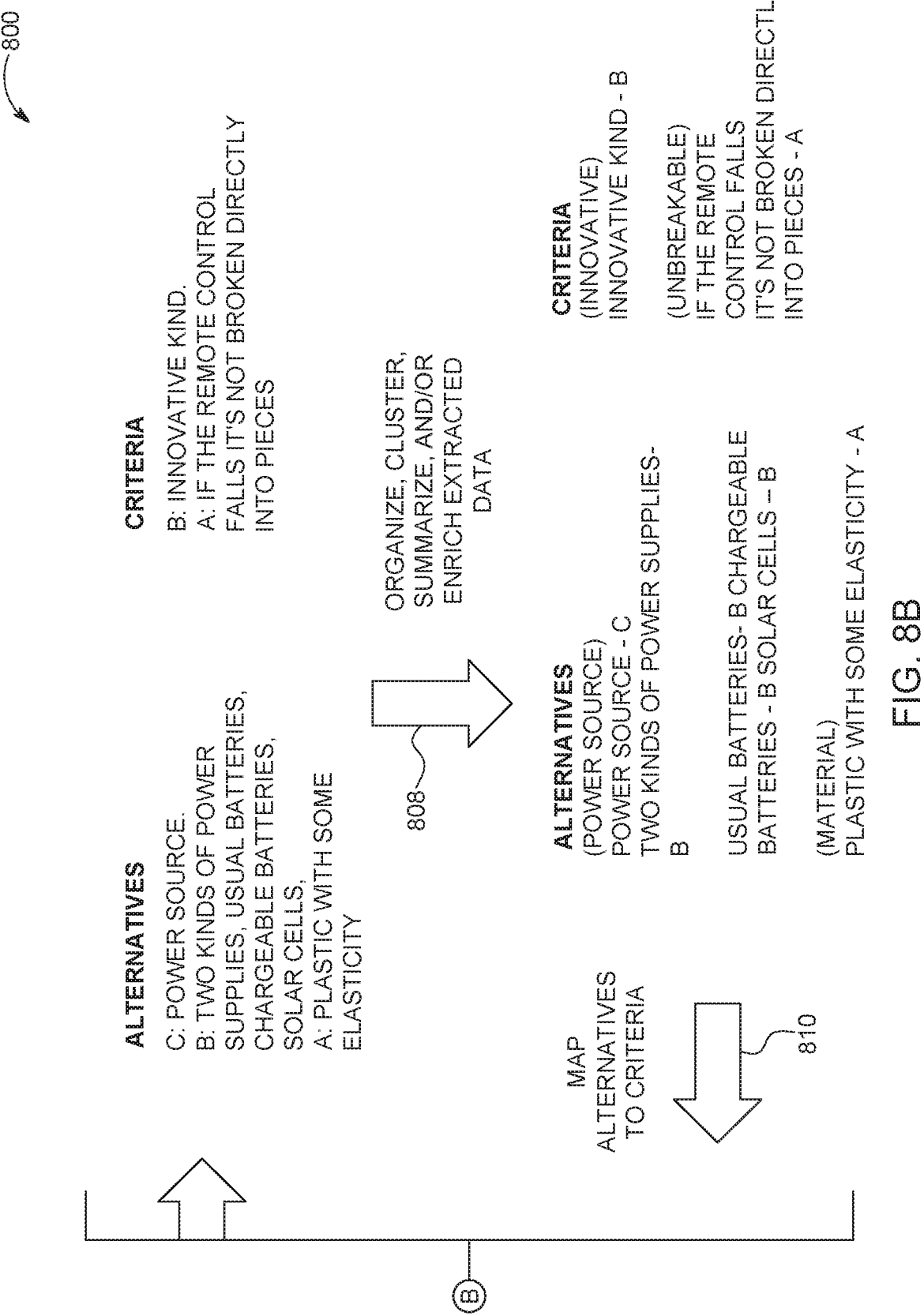

FIG. 8A-8B is an additional flowchart diagram 800 depicting an additional exemplary method for extracting and summarizing decision elements from one or more communications, again in which various aspects of the present invention may be realized. The functionality 800 may be implemented as a method executed as instructions on a machine, where the instructions are included on at least one computer readable medium or one non-transitory machine-readable storage medium. The functionality 800 may start in block 802 by identifying a transcription/text data with one or more speakers. One or more passages of the transcription/text data containing decisions, discussions, and discussion topics may be identified, as in block 804. One or more specific mentions or discussions of alternatives (e.g., alternative suggestions, alternative choices, alternative decisions, etc.) and criteria of one or more decisions may be extracted from the transcription/text data, as in block 806. For example, speakers A, B, and C may provide alternatives and criteria based on examples described in FIGS. 7A-7F. The extracted data (e.g., alternatives and criteria) may be organized, clustered, summarized, and/or enriched (via external resources/domain knowledge), as in block 808. One or more of the alternatives may be mapped to the one or more criteria relating to the decisions, as in block 810 (e.g., as illustrated in FIG. 8A with arrows from the alternatives to the criteria). A structured output (e.g., summary) may be provided for an API and/or visually displayed in a user interface (e.g., GUI), as in block 812.

Figure 9:
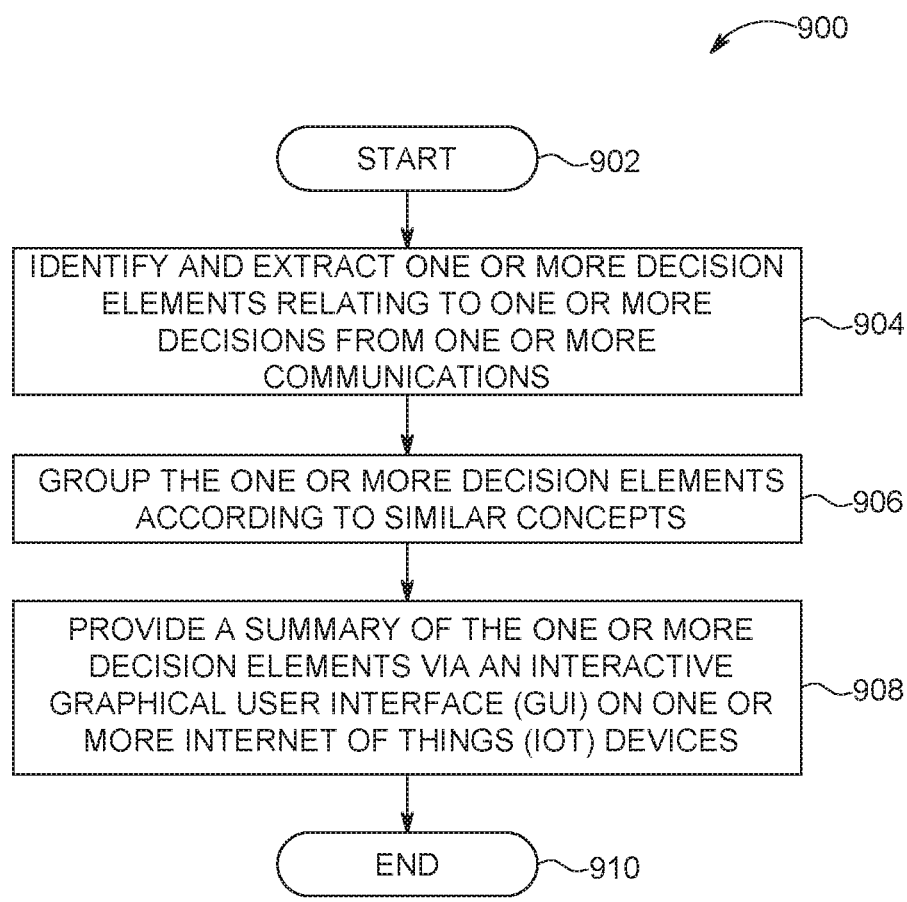
FIG. 9 is an additional flowchart diagram depicting an additional exemplary method for extraction and summarization of decision elements from one or more communications, again in which various aspects of the present invention may be realized.

FIG. 9 is an additional flowchart diagram 900 depicting an additional exemplary method for extracting and summarizing decision elements from one or more communications, again in which various aspects of the present invention may be realized. The functionality 900 may be implemented as a method executed as instructions on a machine, where the instructions are included on at least one computer readable medium or one non-transitory machine-readable storage medium. The functionality 900 may start in block 902. Decision elements such as, for example, alternatives and suggestions, relating to one or more decisions (and/or criteria) may be identified from one or more communications, as in block 904. The decision elements may be grouped together according to similar concepts, as in block 906. A summary of the plurality of the decision elements via an interactive graphical user interface (GUI) on one or more Internet of Things (IoT) devices may be provided, as in block 908. The functionality 900 may end, as in block 910.

In one aspect, in conjunction with and/or as part of at least one block of FIG. 9, the operations of method 900 may include each of the following. The operations of method 900 may identify segments and topics that pertain to the one or more decisions, identify each decision element pertaining to the one or more decisions and the criteria of each of the one or more decisions; identify and extract the criteria and one or more alternative suggestions relating to the one or more decisions; map the one or more alternative suggestions to the criteria; and/or identify a consensus or dissension to the one or more decisions by one or more users involved in the communications. The operations of method 900 may link the summary of the plurality of the decision elements to a domain knowledge and enhance the summary using the domain knowledge. One or more of the decisions may be recommended according to a ranking of the criteria of each of the one or more decisions.

The operations of method 900 may process the communications using natural language processing (NLP); convert an image or video data of the communications to text data; and/or convert audio data of the communications to text data. A machine learning mechanism may be initialized and use feedback information to learn decision elements of communication and learn/identify one or more persons communicating the decision elements.

Thus, extracting and summarizing decision elements from one or more communications, as described herein, enables the automated creation of a decision summary from transcripts from non-facilitated discussions. This summary improves the effectiveness of decision-making discussions. The output of the mechanisms of the illustrated embodiments may also serve as the basis for negotiation facilitations, as a searchable source of information to check compliance with process (for instance for human resource ("HR") discussions or for financial advice discussions), and further decision support tasks such as trade-off elicitation or recommendation. Finally, the system also enables the user to visually observe, for each relation mentioned in the text data, the text fragments that have been extracted to review and correct, providing feedback to the system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for automated extraction and summarization of decision discussions of a communication by a processor, comprising:
  receiving a plurality of communications related to a single topic from one or more data sources including document sources, electronic communication sources, audio sources, and video sources;
  reducing each of the plurality of communications into a text document; wherein natural language processing (NLP) is utilized to transcribe content received from the electronic communication sources, audio sources, and video sources into text of the text document; and wherein one or more users having authored the plurality of communications is attributed to the text of the text document during the reduction;
  identifying and extracting decision elements relating to one or more decisions from the plurality of communications so as to provide a summary of the decision elements; wherein artificial intelligence (AI) is used to aggregate and prioritize the decision elements within the summary; and wherein the AI identifies the decision elements by inference notwithstanding whether or not the decision elements related to the single topic are specifically named or mentioned in the plurality of communications;
  grouping, clustering, and organizing the decision elements based on context, similar sentiments, similar concepts, and timestamps of the plurality of communications; wherein the decision elements comprise alternative suggestions and one or more criteria;
  mapping the alternative suggestions to the one or more criteria;
  automatically recommending, within the summary, one or more of the decisions according to a ranking of alternative suggestions associated with the respective one or more criteria; providing within the summary at least an identified consensus and dissension identified from the extracted decision elements, relating to the one or more decisions by the one or more users involved in the plurality of communications;
  displaying the summary of the decision elements via an interactive graphical user interface (GUI) on one or more Internet of Things (IoT) devices; wherein displaying the summary includes displaying the plurality of communications in original form, prior to the reduction into the text document, as an overlay atop respective ones of the decision elements within the summary upon the one or more users performing an input gesture on the respective ones of the decision elements to which the plurality of communications are associated; and
  linking the displayed decision elements to external resources associated with a domain knowledge to support the one or more decisions, the alternative suggestions, and the one or more criteria.

2. The method of claim 1, further including identifying segments and topics that pertain to the one or more decisions.

3. The method of claim 1, further including linking together each of the decision elements.

4. The method of claim 1, further including enhancing the summary using the domain knowledge.

5. The method of claim 1, further including analyzing one or more sentiments by the one or more users in relation to the one or more decision elements.

6. A system for automated extraction and summarization of decision discussions of a communication, comprising:
  one or more computers with executable instructions that when executed cause the system to:
    receive a plurality of communications related to a single topic from one or more data sources including document sources, electronic communication sources, audio sources, and video sources;
    reduce each of the plurality of communications into a text document; wherein natural language processing (NLP) is utilized to transcribe content received from the electronic communication sources, audio sources, and video sources into text of the text document; and wherein one or more users having authored the plurality of communications is attributed to the text of the text document during the reduction;
    identify and extract decision elements relating to one or more decisions from the plurality of communications so as to provide a summary of the decision elements; wherein artificial intelligence (AI) is used to aggregate and prioritize the decision elements within the summary; and wherein the AI identifies the decision elements by inference notwithstanding whether or not the decision elements related to the single topic are specifically named or mentioned in the plurality of communications;

group, cluster, and organize the decision elements based on context, similar sentiments, similar concepts, and timestamps of the plurality of communications; wherein the decision elements comprise alternative suggestions and one or more criteria;

map the alternative suggestions to the one or more criteria;

automatically recommend, within the summary, one or more of the decisions according to a ranking of alternative suggestions associated with the respective one or more criteria; providing within the summary at least an identified consensus and dissension identified from the extracted decision elements, relating to the one or more decisions by the one or more users involved in the plurality of communications;

display the summary of the decision elements via an interactive graphical user interface (GUI) on one or more Internet of Things (IoT) devices; wherein displaying the summary includes displaying the plurality of communications in original form, prior to the reduction into the text document, as an overlay atop respective ones of the decision elements within the summary upon the one or more users performing an input gesture on the respective ones of the decision elements to which the plurality of communications are associated; and link the displayed decision elements to external resources associated with a domain knowledge to support the one or more decisions, the alternative suggestions, and the one or more criteria.

7. The system of claim 6, wherein the executable instructions further identify segments and topics that pertain to the one or more decisions.

8. The system of claim 6, wherein the executable instructions further link together each of the decision elements.

9. The system of claim 6, wherein the executable instructions further enhance the summary using the domain knowledge.

10. The system of claim 6, wherein the executable instructions further analyze one or more sentiments by the one or more users in relation to the one or more decision elements.

11. A computer program product for automated extraction and summarization of decision discussions of a communication by a processor, the computer program product comprising a non-transitory computer-readable storage medium having computer-readable program code portions stored therein, the computer-readable program code portions comprising:

an executable portion that receives a plurality of communications related to a single topic from one or more data sources including document sources, electronic communication sources, audio sources, and video sources;

an executable portion that reduces each of the plurality of communications into a text document; wherein natural language processing (NLP) is utilized to transcribe content received from the electronic communication sources, audio sources, and video sources into text of the text document; and wherein one or more users having authored the plurality of communications is attributed to the text of the text document during the reduction;

an executable portion that identifies and extracts decision elements relating to one or more decisions from the plurality of communications so as to provide a summary of the decision elements; wherein artificial intelligence (AI) is used to aggregate and prioritize the decision elements within the summary; and wherein the AI identifies the decision elements by inference notwithstanding whether or not the decision elements related to the single topic are specifically named or mentioned in the plurality of communications;

an executable portion that groups, clusters, and organizes the decision elements based on context, similar sentiments, similar concepts, and timestamps of the plurality of communications; wherein the decision elements comprise alternative suggestions and one or more criteria;

an executable portion that maps the alternative suggestions to the one or more criteria;

an executable portion that automatically recommends, within the summary, one or more of the decisions according to a ranking of alternative suggestions associated with the respective one or more criteria; providing within the summary at least an identified consensus and dissension identified from the extracted decision elements, relating to the one or more decisions by the one or more users involved in the plurality of communications;

an executable portion that displays the summary of the decision elements via an interactive graphical user interface (GUI) on one or more Internet of Things (IoT) devices; wherein displaying the summary includes displaying the plurality of communications in original form, prior to the reduction into the text document, as an overlay atop respective ones of the decision elements within the summary upon the one or more users performing an input gesture on the respective ones of the decision elements to which the plurality of communications are associated; and an executable portion that links the displayed decision elements to external resources associated with a domain knowledge to support the one or more decisions, the alternative suggestions, and the one or more criteria.

12. The computer program product of claim 11, further including an executable portion that identifies segments and topics that pertain to the one or more decisions.

13. The computer program product of claim 11, further including an executable portion that links together each of the decision elements.

14. The computer program product of claim 11, further including an executable portion that enhances the summary using the domain knowledge.

15. The computer program product of claim 11, further including an executable portion that analyzes one or more sentiments by the one or more users in relation to the one or more decision elements.

* * * * *